United States Patent [19]

Richardson et al.

[11] Patent Number: 5,709,474

[45] Date of Patent: Jan. 20, 1998

[54] REFRACTORY SHEATH FOR SENSORS

[75] Inventors: David James Richardson, New Castle, Pa.; Harry G. Clauss, Jr., Delanco, N.J.

[73] Assignee: L&N Metallurgical Products Co., Elport, Pa.

[21] Appl. No.: 339,544

[22] Filed: Nov. 15, 1994

[51] Int. Cl.$^6$ .............................. G01K 1/10; G01K 1/12; F16L 9/14

[52] U.S. Cl. .......................... 374/140; 136/234; 266/99; 138/125; 138/153

[58] Field of Search ................................. 374/139, 140; 136/234; 266/87, 88, 99; 138/125, 138, 153, 174

[56] References Cited

U.S. PATENT DOCUMENTS

| | | | |
|---|---|---|---|
| 2,303,704 | 12/1942 | Oseland | 374/140 |
| 3,501,957 | 3/1970 | Jones, Jr. | 374/140 |
| 3,709,040 | 1/1973 | Coe | 374/140 |
| 3,816,183 | 6/1974 | Kraus | 136/234 |
| 3,976,286 | 8/1976 | Thompson et al. | 266/225 |
| 4,018,250 | 4/1977 | Waters | 138/140 |
| 4,093,193 | 6/1978 | Cassidy et al. | 266/87 |
| 4,097,569 | 6/1978 | Waters | 264/255 |
| 4,135,538 | 1/1979 | Kurita | 136/234 |
| 4,433,832 | 2/1984 | Butts | 266/87 |
| 4,468,009 | 8/1984 | Clauss et al. | 266/99 |
| 4,521,639 | 6/1985 | Falk | 374/139 |
| 4,582,951 | 4/1986 | Shuttleworth | 136/234 |
| 4,645,865 | 2/1987 | Cassidy | 136/234 |
| 4,724,428 | 2/1988 | Brown, Jr. | 374/139 |
| 4,762,571 | 8/1988 | Kaufman et al. | 136/234 |
| 4,796,671 | 1/1989 | Furushima et al. | 138/140 |
| 4,842,418 | 6/1989 | Conti | 374/139 |
| 4,964,736 | 10/1990 | Cure et al. | 374/140 |
| 5,069,553 | 12/1991 | Phillippi | 374/140 |
| 5,181,779 | 1/1993 | Shia et al. | 374/139 |
| 5,209,571 | 5/1993 | Kendall | 374/139 |
| 5,456,761 | 10/1995 | Auger et al. | 374/139 |

FOREIGN PATENT DOCUMENTS

| | | | |
|---|---|---|---|
| 2236966 | 2/1973 | Germany | 374/139 |
| 0107378 | 9/1978 | Japan | 374/140 |

*Primary Examiner*—Diego F.F. Gutierrez
*Attorney, Agent, or Firm*—Panitch Schwarze Jacobs & Nadel, P.C.

[57] ABSTRACT

There is provided a resin-silica sleeve or sheath for a sensor. The sheath has coating layer applied to its outer surface to improve the mechanical fracture strength and abrasion resistance of the sheath. The sheath, preferably, includes an inner layer or core and a non-reactive layer disposed about the inner layer, wherein the coating layer is disposed about the non-reactive layer.

7 Claims, 1 Drawing Sheet

REFRACTORY SHEATH FOR SENSORS

The present invention relates generally to sensors that are immersed within molten metal for measuring characteristics. More particularly, the present invention relates to an improved refractory sheath for enclosing a thermocouple cartridge that prevents a non-reactive outer layer from fracturing and abrading during transport, handling and use by the application of a coating material to the non-reactive layer.

BACKGROUND OF THE INVENTION

For the refinement and preparation of molten metal, a sensing device may be immersed within a bath of molten metal in order to quickly and accurately determine certain qualities, such as the temperature, oxygen content, silicon content, carbon predictions and aluminum predictions of the molten metal. Due to the high temperatures of the molten metal, the sensing device, or any outer covering thereon, may react with the molten metal when immersed within the bath, thereby causing the molten metal to splash at the surface. Such a reaction would cause undesirable reoxidation of the molten metal to occur and, in addition, produces a potentially dangerous situation where high temperature molten metal splashes near workers in the immediate area.

Refractory protection sheaths that limit reactions with molten metal may also act as thermal insulators. For example, U.S. Pat. No. 4,468,009 to H. G. Clauss, et al., which issued on Aug. 28, 1984, relates to a refractory protection sheath formed from an inner perforated metal tube enclosed by an outer insulating layer of refractory fibers. The inner perforated metal tube provides structural strength throughout the sheath. The outer layer consists of a composition of alumina and silica to provide sufficient thermal insulation and permit multiple insertion into a molten metal bath. The outer layer prevents the metal tube from melting and is non-reactive with the molten metal.

Refractory sheaths having an outer layer comprising sand are preferred due to their capability of enduring high temperatures and being produced at low cost. However, one problem associated with such sheaths is that the outer surface of the outer layer can be damaged (i.e., fractured or abraded) during handling and transporting. Sand compositions, in particular, have a tendency to fracture upon impact and to abrade during shipment. Such damage may degrade the performance of the sheath and the sensing device as well. Therefore, there is a need for a refractory sheath that utilizes sand to provide high quality performance at a minimal cost, without incurring damage during handling and transporting due to the coating.

The addition of a covering layer to an intermediate ceramic layer or surface of a protection sheath for binding the ceramic layers is known. However, such a covering layer is not typically used to prevent fracture or abrasion problems. In particular, U.S. Pat. No. 4,093,193 to J. E. Cassidy, et al., which issued on Jun. 6, 1978, provides a composite protection tube having a single layer of an outer wrap or coveting layer, made of paper, that is spirally wound about intermediate layers of ceramic cloth bonded together. The primary purpose of the outer wrap is to prevent the intermediate ceramic layers from unwinding so that the ceramic cloth has sufficient time to bond.

The present invention overcomes the inherent deficiencies of using sand as an outer layer of a refractory sheath. In particular, the present invention provides protection to the outer layer of the sheath during transportation, handling and use, without causing undesirable metal splashing when immersed within a molten bath.

The present invention also provides many additional advantages which shall become apparent as described below.

SUMMARY OF THE INVENTION

The present invention, in brief summary, comprises a sheath having: an inner layer disposed about at least a portion of a sensor; a non-reactive layer disposed about the inner layer such that the inner layer is disposed between the sensor and the non-reactive layer, the non-reactive layer being capable of preventing a reaction between the inner layer and the molten material; and a coating layer disposed about the outer surface of the non-reactive layer, wherein the coating layer prevents fracturing and abrasion of the non-reactive layer.

The present invention also includes a method for providing a protective layer to a consumable sensor that is immersed within a molten material. The method comprises the steps of applying a non-reactive material about the outer surface of a hollow, cylindrical inner core and then heat treating the coated inner core to a temperature in the range between about 90° C. to 300° C. for about 1 to 60 minutes, thereby forming a non-reactive layer about the inner core; and applying a coating material about the outer surface of the non-reactive layer and then heat treating the coating material to a temperature in the range between about 32.2° C. to 300° C. for about 1 to 60 minutes, thereby forming a coating layer about the non-reactive layer.

The foregoing objects and advantages of the present invention will be more apparent from the following detailed explanation of the preferred embodiments of the invention in connection with the accompanying drawings.

DETAILED DESCRIPTION OF THE PREFERRED EMBODIMENT

The refractory sheath in accordance with the present invention has a variety of uses in connection with molten metal such as a non-splash thermocouple lance, a riser sleeve, ladle stopper rods, etc.

Figure 1:
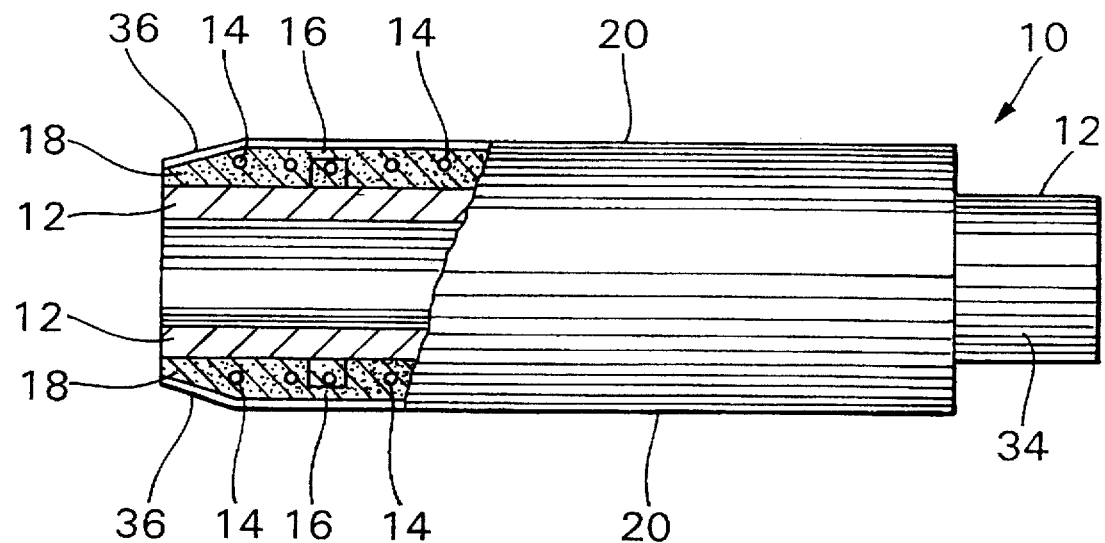
FIG. 1 is a cutaway side view of the refractory sheath of the present invention showing a partial cross-section therethrough.

Referring to the drawings and, in particular, to FIG. 1, there is provided a refractory protection sheath which is generally represented by reference numeral 10. Sheath 10 is an elongated hollow device having a substantially cylindrical shape. Sheath 10 is situated about at least a portion of a sensing device (not shown), such as a thermocouple cartridge, in order to provide thermal protection to various components connected to the sensing device when placed in a bath of molten metal. The sensing device is placed in the bath for a time period necessary to determine a proper reading, such as temperature, oxygen content, silicon content, carbon predictions and aluminum predictions of the molten metal, and then discarded or prepared for reuse. One end of the sensing device may be exposed outside of sheath 10 in order to directly contact with the molten metal and obtain an accurate reading.

At the inner most portion of refractory protection sheath 10 is a supporting tube or inner layer 12 for accommodating the sensing device. The supporting tube 12 may be made of any type of material sufficient to support the sensing device, such as paperboard or cardboard.

Figure 2:
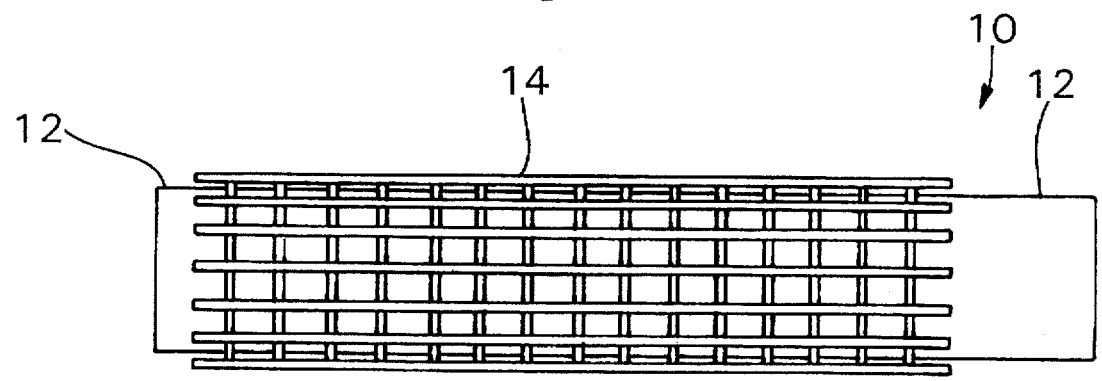
FIG. 2 is an exposed side view of the refractory sheath of the present invention wherein the resin coated non-reactive layer has been removed therefrom to show the metal screen material disposed about the inner paper layer.

Referring to both FIGS. 1 and 2, a screen 14, such as a metallic screen, wire mesh, plastic mesh or fiberglass mesh, is wrapped around the outer periphery of supporting tube 12. Screen 14 is preferably a 23 gauge, ¼" metallic screen or wire mesh. Thereafter, screen 14 is secured around to supporting tube 12 preferably by staples 16 that partially impregnate the outer periphery of supporting tube 12. A resin sand non-reactive layer 18 of sand, such as silica, is molded about the outer surface of supporting tube 12. Wire mesh provides structural strength for non-reactive layer 18, wherein screen 14 is disposed within non-reactive layer 18.

Referring again to FIG. 1 specifically, non-reactive layer 18 which comprises at least one material selected from the group consisting of silica, zircon, zirconia, olivine and chromite is coated about supporting tube 12 by any conventional process, such as thermosetting, skin dried, sodium silicate—$CO_2$, and EFF SET processes. Non-reactive layer 18 is molded around supporting tube 12, thereby forming a non-reactive layer that encapsulates screen 14 and staples 16. In order to settle the sand or other particles of non-reactive layer 18 around and through screen 14, the sheath 10 is vibrated for a short period of time. After the sand particles have settled, non-reactive layer 18 is heat treated to form a solid unified non-reactive layer about supporting tube 12. This non-reactive layer of sand is capable of providing the protection necessary to prevent the supporting tube 12 from reacting with the molten metal. When produced individually, a sheath 10 may be heat treated for about 1 to about 60 minutes from about 90° C. (194° F.) to about 300° C. (572° F.). However, it is preferred that the sheath 10 be heat treated for approximately 1 minute at 260° C. (500° F.) for production of a single sheath or multiple number of sheaths. It is expected that for full production, the heating temperature may be about 260° C. (500° F.) whereby approximately six (6) sheaths may be produced during each minute of production.

The sand, of any kind, used for the non-reactive layer 18 may be any type of non-reactive material, without regard to its AFS (American Foundrysmen's Society) rating. It is preferable that the non-reactive material be rated at 60 AFS. Some such materials are silica, zirconia and zircon. In addition, non-reactive layer 18 may comprise a binder material which is capable of binding the sand together and to the outer surface of supporting layer 12. About 1 to 5% of the non-reactive layer 18 may comprise a resin or other binder material, e.g., phenolic resin, however a resin composition of about 4½% of the non-reactive layer is preferred due to its durability and resistance to fracturing. When sheath 10 comes in contact with the molten metal, the resin ignites and produces gases. The resin is an organic binder that produces oxides of carbon, such as carbon dioxide and carbon monoxide, when it combusts. However, the combustion of the resin will cause minimal splashing of the molten metal since the gases produced will come up through the route of least resistance, i.e., through the sand and not the molten metal. Thus, the molten metal will be left alone and a hazardous condition will not be created.

Coating layer 20 is capable of preventing fracturing and abrasion of sheath 10 and may be brushed, dipped, sprayed or otherwise applied to the outer surface of non-reactive layer 18. It is preferable that coating layer 20 comprise at least one material selected from the group consisting of: acrylic emulsions, phenolic resins, epoxy resins, phenol formaldehyde, urea formaldehyde, potassium silicate, sodium silicate, Bis-pheno-A-Epoxy, and any suitable protective coating. One particularly suitable acrylic emulsion is a crosslinking polyvinyl acetate, No. XB-90MO-LF, which is formed from water, melamine-phenol-formaldehyde copolymer and N-methylolacrylamide-vinyl acetate copolymer, sold commercially by ACME/Borden of Westchester, Ill. Although coating layer 20 may be directly applied to non-reactive layer 18, the concentration thereof may also be diluted in order to reduce the cost of such an additional layer. In fact, a coating layer comprising about 50% by weight of a polyvinyl acetate and 50% by weight of water has been found to provide adequate protection to non-reactive layer 18. After application, coating layer 20 is allowed to soak into the non-reactive layer 18 and then bond to the insulating layer by heat treating sheath 10. Similar to the heat treating process of insulating layer 18 described above, coating layer 20 may be heat treated for a single sheath or multiple sheaths at about 32.2° C. (90° F.) to about 300° C. (572° F.) for about 1 to 60 minutes. Preferably, the coating layer 20 is heat treated at about 176.7° C. (350° F.) for about 10 minutes. For full production, it is expected that the coating layer 20 of a multiple number of sheaths may be heat treated at the same time whereby one sheath is produced, on average, for each minute of production.

One of the advantages of using a coating layer such as an acrylic emulsion is its ability to elude splashing of molten metal when immersed. When coating layer 20 contacts the molten metal and experiences its extremely high temperature, the coating layer vaporizes instantly without producing a splash and does not last long enough to submerge beneath the surface of the molten metal. Therefore, coating layer 20 escapes into the atmosphere without having the opportunity to created gas bubbles within the molten metal which cause the molten metal to splash dangerously about the workplace.

The dimensions of the refractory protection sheath 10 are variable, being limited only by its internal volume and its weight. Sheath 10 must be large enough to accommodate its corresponding sensing device and yet light enough to remain manageable by an operator. Typically, the sensing device is extended from an end of a hand held pole and is lowered into a molten metal bath by an operator at the other end. Thus, sheath 10 may not be too large so as to be unmanageable when using a hand held pole. However, it is recognized that by the advancement of technology, sensing devices may have microscopic proportions and, also, machinery may be used instead of hand held poles to lower a sensing device into a molten metal bath. Therefore, sheath 10 of the present invention has an unlimited number of dimensional combinations that may be chosen by a manufacturer or operator.

Optionally, one end of supporting tube 12 may be exposed outside of non-reactive layer 18 in order to provide an extended end 34 for handling sheath 10. For mass production of the sheath 10, the extended end 34 may be held by a machine when forming non-reactive layer 18 and/or coating layer 20. Also, the extended end 34 may provide thermal protection to the hand held pole for the portion that is not immersed within molten metal. Furthermore, the extended end 34 would not come in contact with the molten metal and would not require protection by means of non-reactive layer 18. Thus, an additional cost savings is achieved by limiting the amount of non-reactive layer 18, as well as the resin included therein, disposed about the supporting tube 12. Also, at the other end of sheath 10, non-reactive layer 18 may have a tapered portion 36, as shown in FIG. 1, formed to allow a smoother transition of the sheath into the molten metal bath and further reducing splashing of the molten metal. However, instead of the tapered portion 36, sheath 10 may have a blunt end which provides adequate performance for most applications and is easier to manufacture.

The invention having been thus described with particular reference to the preferred forms thereof, it will be obvious that various changes and modifications may be made therein without departing from the spinet and scope of the invention as defined in the appended claims.

What is claimed is:

1. A non-reactive sheath for a sensor to be immersed in a molten material, said sheath comprising:

an inner layer comprised of one of paper and cardboard disposed about at least a portion of said sensor;

a non-reactive resin/particulate layer comprised of at least one material selected from the group consisting of silica, zircon, zirconia, olivine and chromite, the non-reactive layer being disposed about said inner layer such that said inner layer is disposed between said sensor and said non-reactive layer, said non-reactive layer including a screen affixed to said inner layer for structurally supporting said non-reactive layer about said inner layer, said non-reactive layer preventing a reaction between said inner layer and said molten material when said sheath is immersed into said molten material; and a protective coating layer formed of a material selected from the group consisting of acrylic emulsions, phenolic resins, epoxy resins, phenol formaldehyde, urea formaldehyde, potassium silicate, sodium silicate, and Bispheno-A-Epoxy and disposed about the outer surface of said non-reactive layer, wherein said coating layer prevents fracturing and abrasion of said non-reactive layer and vaporizes upon immersion into said molten material.

2. The non-reactive sheath according to claim 1, wherein said non-reactive layer further comprises a binder material, said binder material being a phenolic resin.

3. The non-reactive sheath according to claim 2, wherein said non-reactive layer comprises about 1% to about 5% phenolic resin.

4. The non-reactive sheath according to claim 2, wherein said non-reactive layer comprises about 4½% phenolic resin.

5. The non-reactive sheath according to claim 1, wherein said screen comprises at least one material selected from the group consisting of: a metallic screen, wire mesh, plastic mesh, and fiberglass mesh.

6. The non-reactive sheath according to claim 1, wherein said screen is affixed to said inner layer by a plurality of staples.

7. The non-reactive sheath according to claim 1, wherein said coating layer is an emulsion of a crosslinking polyvinyl acetate.

* * * * *